United States Patent
Chen et al.

(10) Patent No.: US 10,555,296 B2
(45) Date of Patent: Feb. 4, 2020

(54) CONTROL CHANNEL RESOURCE CONFIGURATION METHOD, BASE STATION, AND TERMINAL DEVICE

(71) Applicant: HUAWEI TECHNOLOGIES CO., LTD., Shenzhen (CN)

(72) Inventors: Zheng Chen, Beijing (CN); Xu Zhang, Beijing (CN); Yan Cheng, Beijing (CN); Lixia Xue, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/236,589

(22) Filed: Dec. 30, 2018

(65) Prior Publication Data

US 2019/0141690 A1 May 9, 2019

Related U.S. Application Data

(63) Continuation of application No. PCT/CN2017/108851, filed on Nov. 1, 2017.

(30) Foreign Application Priority Data

Nov. 3, 2016 (CN) .......................... 2016 1 0974288

(51) Int. Cl.
*H04W 72/04* (2009.01)

(52) U.S. Cl.
CPC ....... *H04W 72/044* (2013.01); *H04W 72/042* (2013.01)

(58) Field of Classification Search
None
See application file for complete search history.

(56) References Cited

U.S. PATENT DOCUMENTS

2011/0200004 A1 8/2011 Nakashima et al.
2011/0317581 A1* 12/2011 Hoshino ............... H04L 1/0026
370/252

(Continued)

FOREIGN PATENT DOCUMENTS

CN 101594335 A 12/2009
CN 102197612 A 9/2011

(Continued)

OTHER PUBLICATIONS

R1-104339 CATT,"Details on R-PDCCH interleaving in LTE-A", 3GPP TSG RAN WG1 meeting #62, Madrid, Spain, Aug. 23-27, 2010, total 5 pages.

*Primary Examiner* — Alex Skripnikov
(74) *Attorney, Agent, or Firm* — Kilpatrick Townsend & Stockton LLP

(57) ABSTRACT

Embodiments of this application provide a control channel configuration method, a base station, and a terminal device. The method includes: determining, by a base station, a configuration of a time-frequency resource unit from at least two configurations of a time-frequency resource unit of a control channel; and sending, by the base station, indication information to a terminal device, where the indication information is used to indicate the configuration of the time-frequency resource unit, and the at least two configurations of a time-frequency resource unit include a first configuration and a second configuration. In the embodiments of this application, the base station can flexibly configure the time-frequency resource unit of the control channel. In addition, flexibly configuring a time-frequency resource unit can reduce a probability that time-frequency resource units of different structures are blocked, thereby reducing complexity of detecting the control channel by the terminal device.

17 Claims, 7 Drawing Sheets

(56) References Cited

U.S. PATENT DOCUMENTS

2014/0036858 A1  2/2014  Shimezawa et al.
2016/0234813 A1  8/2016  Kim et al.

FOREIGN PATENT DOCUMENTS

| CN | 102469059 A | 5/2012 |
| CN | 102870355 A | 1/2013 |
| CN | 103493562 A | 1/2014 |
| CN | 103581094 A | 2/2014 |
| WO | 2014051374 A1 | 4/2014 |

\* cited by examiner

CONTROL CHANNEL RESOURCE CONFIGURATION METHOD, BASE STATION, AND TERMINAL DEVICE

CROSS-REFERENCE TO RELATED APPLICATIONS

This application is a continuation of International Application No. PCT/CN2017/108851, filed on Nov. 1, 2017, which claims priority to Chinese Patent Application No. 201610974288.1, filed on Nov. 3, 2016. The disclosures of the aforementioned applications are hereby incorporated by reference in their entireties.

TECHNICAL FIELD

This application relates to the communications field, and in particular, to a control channel resource configuration method, a base station, and a terminal device.

BACKGROUND

In a fifth-generation wireless access system standard new radio (NR), a basic unit in frequency domain is a subcarrier, and a basic unit in time domain is an orthogonal frequency division multiplexing (OFDM) symbol. A resource element (RE) is a minimum physical resource, and includes one subcarrier in one OFDM symbol.

In the NR, a basic scheduling unit in time domain is a timeslot (timeslot) or mini-slot, and the slot or mini-slot includes several OFDM symbols. As shown in FIG. 1, the slot may be divided into a control area and a data area, and a downlink control channel (PDCCH) carries downlink control information (DCI) and is transmitted in the control area. A resource element group (REG) is a time-frequency resource unit that constitutes a time-frequency resource for the downlink control channel in the control area.

In an existing solution, the downlink control channel is transmitted by using a REG of a fixed structure, and configuration is inflexible.

SUMMARY

Embodiments of this application provide a control channel resource configuration method, a base station, and a terminal device, so as to flexibly configure a time-frequency resource unit of a control channel in a control area.

According to a first aspect, a control channel resource configuration method is provided, including:

determining, by a base station, a configuration of a time-frequency resource unit from at least two configurations of a time-frequency resource unit of a control channel; and sending, by the base station, indication information to the terminal device, where the indication information is used to indicate the configuration of the time-frequency resource unit, where the at least two configurations of a time-frequency resource unit include a first configuration and a second configuration;

a time-frequency resource unit of the first configuration occupies one orthogonal frequency division multiplexing symbol in time domain, and a reference signal is located on the orthogonal frequency division multiplexing symbol occupied by the time-frequency resource unit of the first configuration; and a time-frequency resource unit of the second configuration occupies at least two orthogonal frequency division multiplexing symbols in time domain, and a reference signal is located on at least one of the at least two orthogonal frequency division multiplexing symbols occupied by the time-frequency resource unit of the second configuration.

In this embodiment of this application, the base station can flexibly configure the time-frequency resource unit of the control channel in a control area.

In addition, flexibly configuring a time-frequency resource unit can reduce a probability that time-frequency resource units of different structures are blocked, thereby reducing complexity of detecting the control channel by the terminal device.

In a possible implementation, the control channel is transmitted in at least one time-frequency resource area in a control area; and the determining, by a base station, a configuration of a time-frequency resource unit from at least two configurations of a time-frequency resource unit of a control channel includes:

determining, by the base station, a configuration of a time-frequency resource unit in each of the at least one time-frequency resource area from the at least two configurations of a time-frequency resource unit, where the indication information is used to indicate a configuration of a time domain resource unit in each of the at least one time-frequency resource area.

In a possible implementation, the control area in which the time-frequency resource unit of the control channel is located occupies at least three orthogonal frequency division multiplexing symbols in time domain, and the configuration of the time-frequency resource unit includes the first configuration and/or the second configuration.

In a possible implementation, the time-frequency resource unit of the second configuration is located on at least two adjacent orthogonal frequency division multiplexing symbols in the orthogonal frequency division multiplexing symbols occupied by the control area.

In a possible implementation, in a same time-frequency resource area, the time-frequency resource unit of the first configuration and the time-frequency resource unit of the second configuration are located on different orthogonal frequency division multiplexing symbols of the control area.

In a possible implementation, each of at least two of the orthogonal frequency division multiplexing symbols occupied by the time-frequency resource unit of the second configuration carries a different quantity of reference signals; or each of the orthogonal frequency division multiplexing symbols occupied by the time-frequency resource unit of the second configuration carries a same quantity of reference signals.

In a possible implementation, the reference signals respectively carried in the orthogonal frequency division multiplexing symbols occupied by the time-frequency resource unit of the second configuration are located in a same frequency domain location.

In a possible implementation, the reference signals respectively carried in the orthogonal frequency division multiplexing symbols occupied by the time-frequency resource unit of the second configuration are located in different frequency domain locations.

In a possible implementation, there is a correspondence between the configuration of the time-frequency resource unit and a downlink control information format, and the configuration of the time-frequency resource unit is indicated by using the downlink control information format; and the sending, by the base station, indication information to the terminal device includes:

determining, by the base station based on the configuration of the time-frequency resource unit and the correspondence, the downlink control information format corresponding to the configuration of the time-frequency resource unit; and sending, by the base station, downlink control information in the corresponding format to the terminal device.

In a possible implementation, the indication information is carried in an indication channel, and the indication channel is transmitted in a time-frequency resource area in the control area.

In a possible implementation, the indication information carried in the indication channel transmitted in the time-frequency resource area is used to indicate a configuration of a time-frequency resource unit in the time-frequency resource area.

In a possible implementation, the indication information is carried in downlink control information; and the control area includes a basic set area and an extended set area, a control channel in which the downlink control information is located is transmitted in the basic set area, and the configuration of the time-frequency resource unit is a configuration of a time-frequency resource unit of a control channel transmitted in the extended set area.

In a possible implementation, the control area includes a basic set area; and a configuration of a time-frequency resource unit of a control channel transmitted in the basic set area is preconfigured, or a configuration of a time-frequency resource unit of a control channel transmitted in the basic set area is indicated by using a broadcast channel.

In a possible implementation, the indication information is carried in higher layer signaling or system information.

In a possible implementation, the control area in which the time-frequency resource unit of the control channel is located occupies at least two orthogonal frequency division multiplexing symbols in time domain.

According to a second aspect, a control channel resource configuration method is provided, including:

receiving, by a terminal device, indication information sent by a base station, where the indication information is used to indicate a configuration of a time-frequency resource unit of a control channel, and the configuration of the time-frequency resource unit is determined by the base station from at least two configurations of a time-frequency resource unit; and detecting, by the terminal device, the control channel based on the configuration of the time-frequency resource unit, where the at least two configurations of a time-frequency resource unit include a first configuration and a second configuration;

a time-frequency resource unit of the first configuration occupies one orthogonal frequency division multiplexing symbol in time domain, and a reference signal is located on the orthogonal frequency division multiplexing symbol occupied by the time-frequency resource unit of the first configuration; and a time-frequency resource unit of the second configuration occupies at least two orthogonal frequency division multiplexing symbols in time domain, and a reference signal is located on at least one of the at least two orthogonal frequency division multiplexing symbols occupied by the time-frequency resource unit of the second configuration.

In this embodiment of this application, the base station can flexibly configure a time-frequency resource unit that constitutes a time-frequency resource for the control channel in a control area.

In addition, flexibly configuring a time-frequency resource unit can reduce a probability that time-frequency resource units of different structures are blocked, thereby reducing complexity of detecting the control channel by the terminal device.

In addition, the terminal device detects the control channel based on the configuration of the time-frequency resource unit indicated by the base station. This can reduce the complexity of detecting the control channel by the terminal device.

In a possible implementation, the control channel is transmitted in at least one time-frequency resource area in a control area; and the indication information is used to indicate a configuration of a time domain resource unit in each of the at least one time-frequency resource area.

In a possible implementation, the control area occupies at least three orthogonal frequency division multiplexing symbols in time domain, and the configuration of the time-frequency resource unit includes the first configuration and/or the second configuration.

In a possible implementation, the time-frequency resource unit of the second configuration is located on at least two adjacent orthogonal frequency division multiplexing symbols in the orthogonal frequency division multiplexing symbols occupied by the control area.

In a possible implementation, in a same time-frequency resource area, the time-frequency resource unit of the first configuration and the time-frequency resource unit of the second configuration are located on different orthogonal frequency division multiplexing symbols of the control area.

In a possible implementation, each of at least two of the orthogonal frequency division multiplexing symbols occupied by the time-frequency resource unit of the second configuration carries a different quantity of reference signals; or each of the orthogonal frequency division multiplexing symbols occupied by the time-frequency resource unit of the second configuration carries a same quantity of reference signals.

In a possible implementation, the reference signals respectively carried in the orthogonal frequency division multiplexing symbols occupied by the time-frequency resource unit of the second configuration are located in a same frequency domain location.

In a possible implementation, the reference signals respectively carried in the orthogonal frequency division multiplexing symbols occupied by the time-frequency resource unit of the second configuration are located in different frequency domain locations.

In a possible implementation, there is a correspondence between the configuration of the time-frequency resource unit and a downlink control information format, and the configuration of the time-frequency resource unit is indicated by using the downlink control information format; and the receiving, by a terminal device, indication information sent by a base station includes:

receiving, by the terminal device, downlink control information that is sent by the base station and that is in the format corresponding to the configuration of the time-frequency resource unit.

In a possible implementation, the indication information is carried in an indication channel, and the indication channel is transmitted in a time-frequency resource area in the control area.

In a possible implementation, the indication information carried in the indication channel transmitted in the time-frequency resource area is used to indicate a configuration of a time-frequency resource unit in the time-frequency resource area.

In a possible implementation, the indication information is carried in downlink control information; and the control area includes a basic set area and an extended set area, a control channel in which the downlink control information is located is transmitted in the basic set area, and the configuration of the time-frequency resource unit is a configuration of a time-frequency resource unit of a control channel transmitted in the extended set area.

In a possible implementation, the control area includes a basic set area; and a configuration of a time-frequency resource unit of a control channel transmitted in the basic set area is preconfigured, or a configuration of a time-frequency resource unit of a control channel transmitted in the basic set area is indicated by using a broadcast channel.

In a possible implementation, the indication information is carried in higher layer signaling or system information.

In a possible implementation, the control area in which the time-frequency resource unit of the control channel is located occupies at least two orthogonal frequency division multiplexing symbols in time domain.

According to a third aspect, a base station is provided, and the base station is configured to implement the method in any one of the first aspect or the possible implementations of the first aspect.

Specifically, the base station may include units configured to execute the method in any one of the first aspect or the possible implementations of the first aspect.

According to a fourth aspect, a terminal device is provided, and the terminal device is configured to implement the method in any one of the first aspect or the possible implementations of the first aspect.

Specifically, the terminal device may include units configured to execute the method in any one of the first aspect or the possible implementations of the first aspect.

According to a fifth aspect, a base station is provided, including a processor, a transmitter, a memory, and a bus system, where the processor, the transmitter, and the memory are connected to each other by using the bus system, the memory is configured to store an instruction or code, and the processor is configured to execute the instruction or code stored in the memory, so that the base station executes the method in any one of the first aspect or the possible implementations of the first aspect.

According to a sixth aspect, a terminal device is provided, including a processor, a receiver, a memory, and a bus system, where the processor, the receiver, and the memory are connected to each other by using the bus system, the memory is configured to store an instruction or code, and the processor is configured to execute the instruction or code stored in the memory, so that the terminal device executes the method in any one of the second aspect or the possible implementations of the second aspect.

According to a seventh aspect, a computer readable storage medium is provided, where the computer readable storage medium stores a program, and the program enables a base station to execute the method in any one of the first aspect or the possible implementations of the first aspect.

According to an eighth aspect, a computer readable storage medium is provided, where the computer readable storage medium stores a program, and the program enables a terminal device to execute the method in any one of the second aspect or the possible implementations of the second aspect.

According to a ninth aspect, an apparatus is provided, including a processor and a memory, where the memory stores a computer instruction, and the processor executes the computer instruction stored in the memory, so that the apparatus implements the method in any one of the first aspect or the possible implementations of the first aspect, or any one of the second aspect or the possible implementations of the second aspect.

According to a tenth aspect, a computer program is provided, where when the computer program runs on a computer, the computer executes the method in any one of the first aspect or the possible implementations of the first aspect, or any one of the second aspect or the possible implementations of the second aspect.

DESCRIPTION OF EMBODIMENTS

Figure 1:
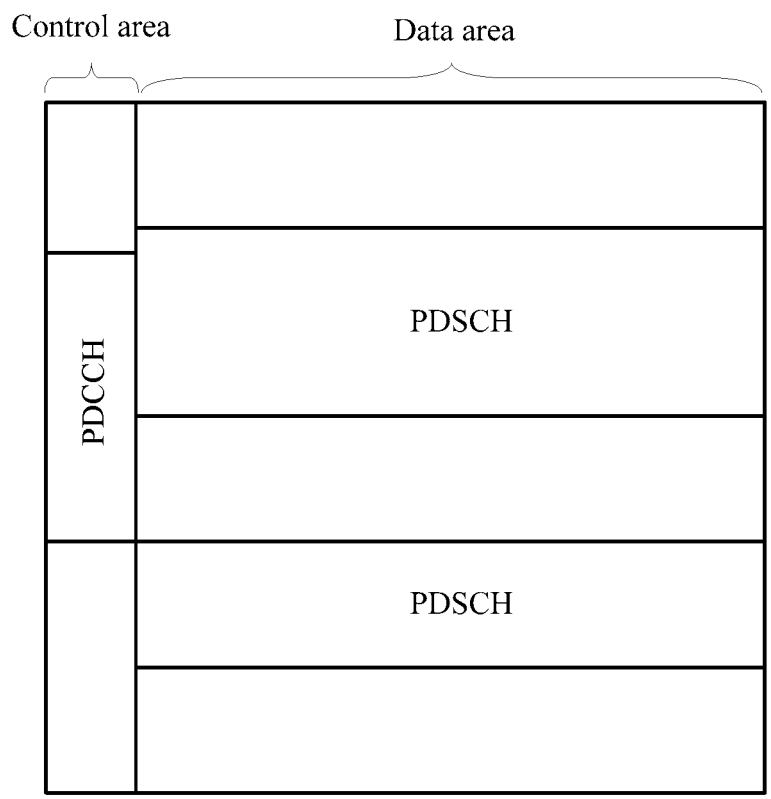
FIG. 1 is a schematic structural diagram of a timeslot.

The following describes the technical solutions in the embodiments of this application with reference to the accompanying drawings in the embodiments of this application.

It should be understood that the technical solutions in the embodiments of this application may be applied to various communications systems, such as Wireless Fidelity (WiFi), Worldwide Interoperability for Microwave Access (WiMAX), a Global System for Mobile Communications (GSM) system, a Code Division Multiple Access (CDMA)

system, a Wideband Code Division Multiple Access (WCDMA) system, a general packet radio service (GPRS) system, a Long Term Evolution (LTE) system, a Long Term Evolution Advanced (LTE-A) system, a Universal Mobile Telecommunications System (UMTS), and a cellular system related to the 3rd Generation Partnership Project (3GPP). The embodiments of this application impose no limitation. However, for ease of description, the embodiments of this application use an LTE network as an example for description.

The embodiments of this application may be used in wireless networks with different standards. A radio access network may include different network elements in different systems. For example, network elements of the radio access network include an evolved NodeB (eNodeB or eNB) in the Long Term Evolution (LTE) and the LTE-A, and network elements of the radio access network include a radio network controller (RNC) and a NodeB in the Wideband Code Division Multiple Access (WCDMA). Similarly, other wireless networks such as the Worldwide Interoperability for Microwave Access (WiMAX) may also use solutions similar to those of the embodiments of this application, but related modules in a base station system may be different. The embodiments of this application impose no limitation. However, for ease of description, the following embodiments use a base station as an example for description.

It should be further understood that in the embodiments of this application, a terminal device may also be referred to as user equipment (UE), a mobile station (MS), a mobile terminal, or the like. The terminal may communicate with one or more core networks by using a radio access network (RAN). For example, the terminal may be a mobile phone (or referred to as a "cellular" phone), or a computer having a communication function. For example, the terminal may be a portable, pocket-sized, handheld, computer built-in, or in-vehicle mobile apparatus.

It should be understood that, the term "and/or" in the embodiments of this application describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

"First" and "second" in the embodiments of this application are merely used for distinguishing, and do not represent a meaning of a sequence or a size.

Figure 2:
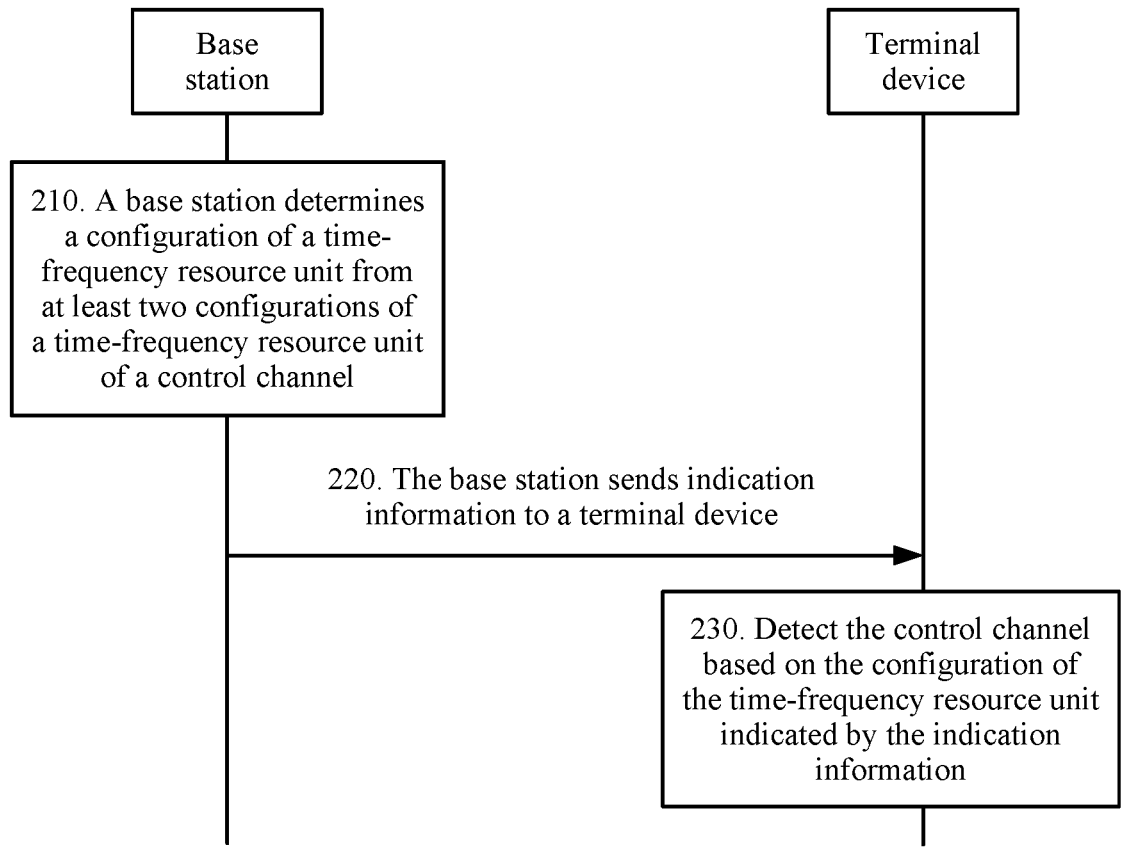
FIG. 2 is a schematic flowchart of a control channel resource configuration method according to an embodiment of this application.

FIG. 2 is a schematic flowchart of a control channel resource configuration method 200 according to an embodiment of this application. As shown in FIG. 2, the method 200 includes the following content.

210. A base station determines a configuration of a time-frequency resource unit from at least two configurations of a time-frequency resource unit of a control channel.

The at least two configurations of a time-frequency resource unit include a first configuration and a second configuration, and the configuration of the time-frequency resource unit is one or more of the at least two configurations of a time-frequency resource unit.

Optionally, a control area in which the time-frequency resource unit of the control channel is located occupies at least two orthogonal frequency division multiplexing symbols in time domain.

The control channel may be a downlink control channel. For example, the control channel may be a PDCCH. For ease of description, the PDCCH is used as an example in the accompanying drawings to describe the control channel. However, this embodiment of this application imposes no limitation thereto. The control channel may alternatively be another downlink control channel.

A time-frequency resource of the control channel may include a plurality of time-frequency resource units.

The time-frequency resource unit may include at least one RE. For example, the time-frequency resource unit may be referred to as a REG.

220. The base station sends indication information to a terminal device, where the indication information is used to indicate the configuration of the time-frequency resource unit.

230. After receiving the indication information sent by the base station, the terminal device detects the control channel based on the configuration of the time-frequency resource unit indicated by the indication information.

The configuration of the time-frequency resource unit includes the first configuration or the second configuration.

In this embodiment of this application, the base station can flexibly configure the time-frequency resource unit of the control channel in the control area.

In addition, flexibly configuring a time-frequency resource unit can reduce a probability that time-frequency resource units of different structures are blocked, thereby reducing complexity of detecting the control channel by the terminal device.

In addition, the terminal device detects the control channel based on the configuration of the time-frequency resource unit indicated by the base station. This can reduce the complexity of detecting the control channel by the terminal device.

Figure 3:
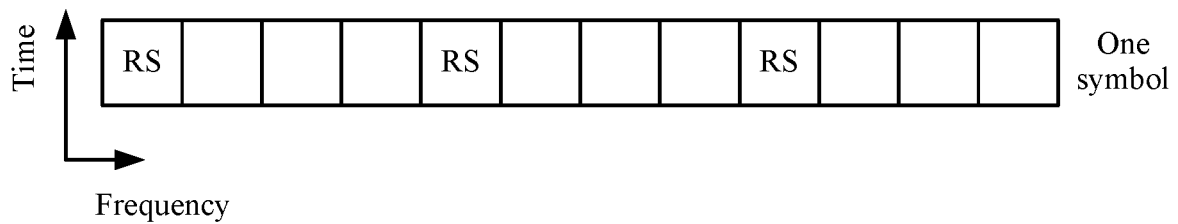
FIG. 3 is a schematic structural diagram of a time-frequency resource unit of a first configuration according to an embodiment of this application.

A time-frequency resource unit of the first configuration occupies one orthogonal frequency division multiplexing symbol in time domain, and a reference signal (RS) is located on the orthogonal frequency division multiplexing symbol occupied by the time-frequency resource unit of the first configuration. Using the time-frequency resource unit of the first configuration can reduce a delay, and therefore the time-frequency resource unit of the first configuration is applicable to a service having a low-delay requirement. As shown in FIG. 3, the time-frequency resource unit of the first configuration may transmit at least one reference signal.

A time-frequency resource unit of the second configuration occupies at least two orthogonal frequency division multiplexing symbols in time domain, and a reference signal is located on at least one of the at least two orthogonal frequency division multiplexing symbols occupied by the time-frequency resource unit of the second configuration.

Optionally, the time-frequency resource unit of the second configuration may further include at least one of the following two implementations.

Implementation 1

Figure 4:
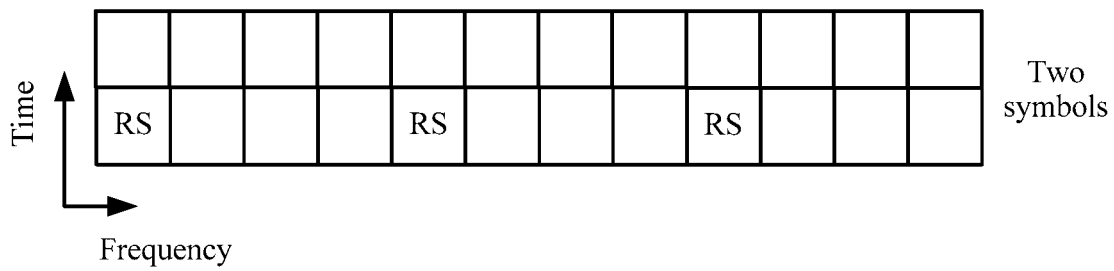
FIG. 4 is a schematic structural diagram of a time-frequency resource unit of a second configuration according to an embodiment of this application.

Each of at least two of the orthogonal frequency division multiplexing symbols occupied by the time-frequency resource unit of the second configuration carries a different quantity of reference signals. Optionally, as shown in FIG. 4, the reference signal is located on either of two orthogonal frequency division multiplexing symbols occupied by the time-frequency resource unit of the second configuration. Using the time-frequency resource unit of the second configuration can reduce reference signal overheads, and therefore the time-frequency resource unit of the second configuration is applicable to a PDCCH in which relatively more information bits need to be transmitted.

Implementation 2

Figure 5:
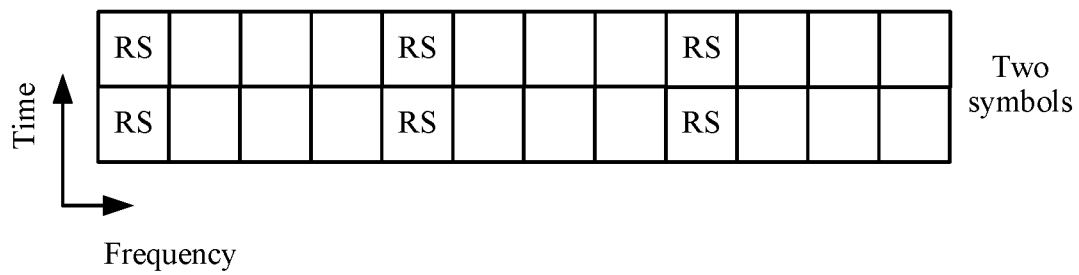
FIG. 5 is another schematic structural diagram of a time-frequency resource unit of a second configuration according to an embodiment of this application.

Each of the at least two orthogonal frequency division multiplexing symbols occupied by the time-frequency resource unit of the second configuration carries a same quantity of reference signals. Optionally, as shown in FIG. 5, the reference signals respectively carried in the at least two orthogonal frequency division multiplexing symbols occupied by the time-frequency resource unit of the second configuration are located in a same frequency domain location. In other words, a subcarrier on which a reference signal carried in a first orthogonal frequency division multiplexing symbol in the at least two orthogonal frequency division multiplexing symbols occupied by the time-frequency resource unit of the second configuration is located is the same as a subcarrier on which a reference signal carried in a second orthogonal frequency division multiplexing symbol is located. It should be noted that the reference signals respectively carried in the two orthogonal frequency division multiplexing symbols occupied by the time-frequency resource unit of the second configuration may alternatively be located in different frequency domain locations. This embodiment of this application imposes no limitation thereto. Sending reference signals on two adjacent orthogonal frequency division multiplexing symbols in time domain by using the time-frequency resource unit of the second configuration can improve channel estimation performance. This manner is applicable to a limited coverage scenario (for example, a cell edge user), and can improve control channel demodulation performance.

It should be understood that FIG. 4 and FIG. 5 merely use two orthogonal frequency division multiplexing symbols in time domain as an example for description, but no limitation is imposed in this embodiment of this application.

In this embodiment of this application, the reference signal may be used to demodulate the control channel.

It should be understood that a frequency domain location of at least one reference signal transmitted by the time-frequency resource unit is not limited in this embodiment of this application. For example, sequence symbols of any two reference signals on a same orthogonal frequency division multiplexing symbol in the at least one reference signal may be separated by at least one subcarrier in frequency domain.

Optionally, the indication information may be further used to indicate a time domain location and/or a frequency domain location of a reference signal carried in the time-frequency resource unit.

Optionally, the determining, by a base station, a configuration of a time-frequency resource unit from at least two configurations of a time-frequency resource unit of a control channel in step 210 includes:

determining, by the base station, the configuration of the time-frequency resource unit from the at least two configurations of a time-frequency resource unit based on at least one of a quantity of orthogonal frequency division multiplexing symbols occupied by the control area, a service requirement, or a network environment of the terminal device.

For example, when a service requires a relatively low delay, the base station may determine to use the time-frequency resource unit of the first configuration, so as to meet a low-delay requirement of the service. When relatively few time-frequency resources exist in the control area, the base station may determine to use the time-frequency resource unit in Implementation 1, so as to reduce the reference signal overheads, thereby avoiding a limitation on a capacity of the control channel. When the terminal device is located on a cell edge, the base station may determine to use the time-frequency resource unit in Implementation 2, so as to increase reference signal coverage, thereby improving the channel estimation performance.

It should be noted that, if the control area occupies one orthogonal frequency division multiplexing symbol in time domain, the base station may determine that the configuration of the time-frequency resource unit is the first configuration.

Therefore, the control channel resource configuration method in this embodiment of this application can meet requirements in different scenarios.

Figure 6:
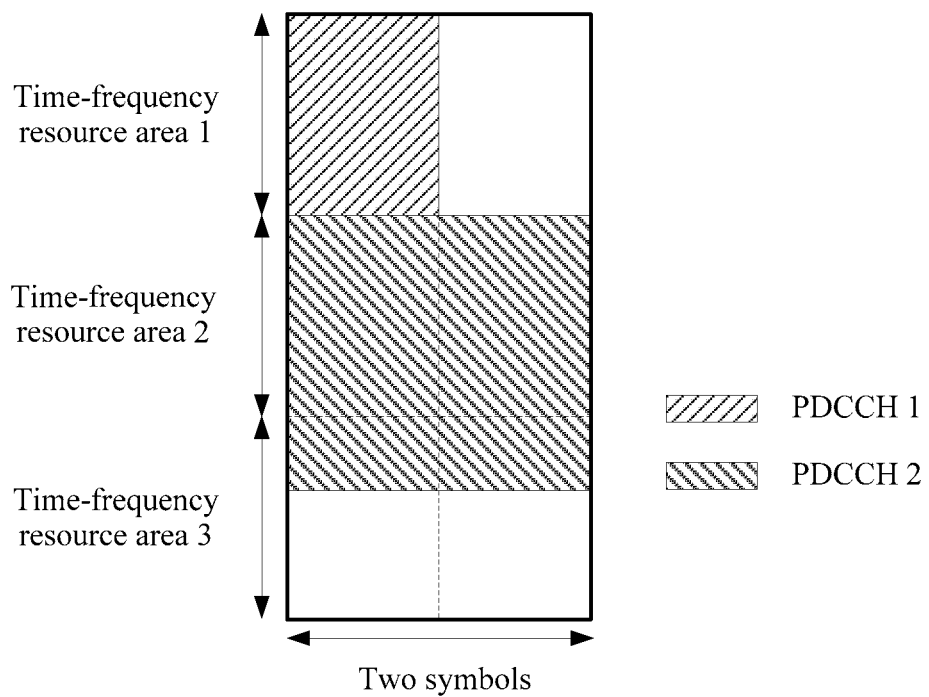
FIG. 6 is a schematic diagram of a time-frequency resource area according to an embodiment of this application.

The control area may include at least one time-frequency resource area. As shown in FIG. 6, the control area includes three time-frequency resource areas. One time-frequency resource area may occupy one or more orthogonal frequency division multiplexing symbols in time domain. It should be noted that one time-frequency resource area is located on an orthogonal frequency division multiplexing symbol occupied by the control area in time domain. For example, if the control area occupies two orthogonal frequency division multiplexing symbols in time domain, one time-frequency resource area is located on the two orthogonal frequency division multiplexing symbols occupied by the control area in time domain; or if the control area occupies three orthogonal frequency division multiplexing symbols in time domain, one time-frequency resource area is located on the three orthogonal frequency division multiplexing symbols occupied by the control area in time domain. The time-frequency resource area may be referred to as a control subband (control subband). However, this embodiment of this application imposes no limitation thereto.

Optionally, the control channel is transmitted in at least one time-frequency resource area in the control area. As shown in FIG. 6, a PDCCH 1 is transmitted in a time-frequency resource area 1, and a PDCCH 2 is transmitted in a time-frequency resource area 2 and a time-frequency resource area 3. One time-frequency resource area may include at least one time-frequency resource unit. It should be understood that, in some embodiments, one time-frequency resource area may further include a time-frequency resource of another granularity, in addition to at least one time-frequency resource unit.

In some embodiments, configurations of time-frequency resource units in different time-frequency resource areas in the at least one time-frequency resource area are the same.

In some embodiments, configurations of time-frequency resource units in different time-frequency resource areas in the at least one time-frequency resource area are different. Correspondingly, the determining, by a base station, a configuration of a time-frequency resource unit from at least two configurations of a time-frequency resource unit of a control channel in step 210 includes: determining, by the base station, a configuration of a time-frequency resource unit in each of the at least one time-frequency resource area from the at least two configurations of a time-frequency resource unit. The indication information sent by the base station is used to indicate a configuration of a time domain resource unit in each of the at least one time-frequency resource area. In other words, when the configurations of the time-frequency resource units in the different time-frequency resource areas in the at least one time-frequency resource area used for transmitting the control channel in the control area are different, the base station may indicate the configuration of the time-frequency resource unit in each time-frequency resource area to the terminal device.

In some embodiments, the control area occupies at least two orthogonal frequency division multiplexing symbols in time domain. Correspondingly, a configuration of a time-frequency resource unit in a first time-frequency resource area includes the first configuration, and a configuration of a time-frequency resource unit in a second time-frequency resource area includes the second configuration. In some embodiments, the control area occupies at least three orthogonal frequency division multiplexing symbols in time domain, a configuration of a time-frequency resource unit in a first time-frequency resource area includes the first configuration, a configuration of a time-frequency resource unit in a second time-frequency resource area includes the first configuration and the second configuration, and a configuration of a time-frequency resource unit in a third time-frequency resource area includes the second configuration.

Figure 7:
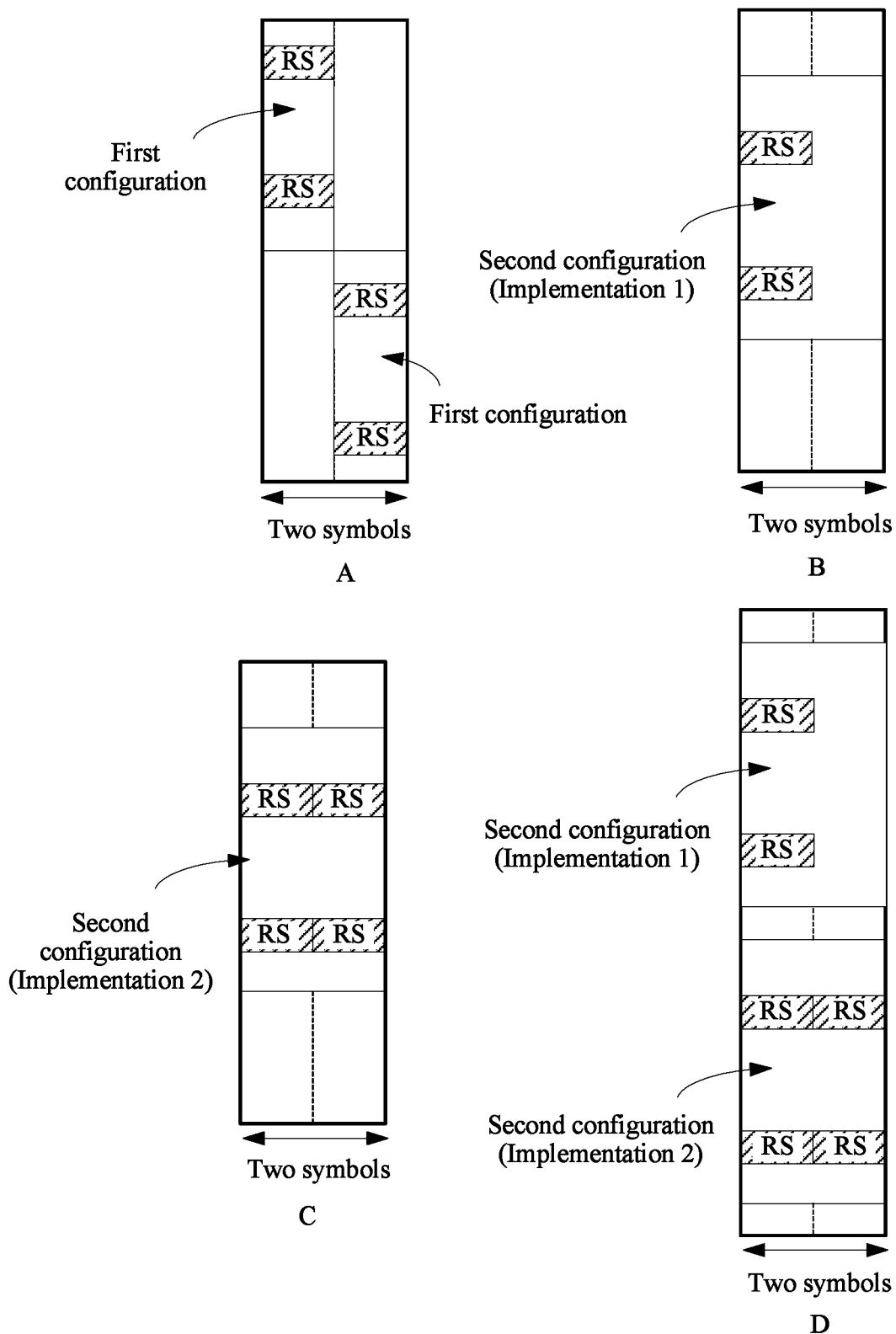
FIG. 7 is a schematic diagram of a configuration of a time-frequency resource unit according to an embodiment of this application.

When the control area occupies at least two orthogonal frequency division multiplexing symbols in time domain, the time-frequency resource unit of the control channel may include the time-frequency resource unit of the first configuration (as shown in A in FIG. 7), or may include the time-frequency resource unit of the second configuration (as shown in B and C in FIG. 7). In FIG. 7, B is the time-frequency resource unit in Implementation 1, and C is the time-frequency resource unit in Implementation 2. It should be noted that, as shown in D in FIG. 7, if the time-frequency resource of the control channel includes at least two time-frequency resource units, at least one time-frequency resource unit may be the time-frequency resource unit in Implementation 1, and at least one time-frequency resource unit may be the time-frequency resource unit in Implementation 2.

It should be noted that, when the control area includes only the time-frequency resource unit of the first configuration, a plurality of time-frequency resource units of the first configuration may be respectively located on different orthogonal frequency division multiplexing symbols of the control area, as shown in A in FIG. 7; or the time-frequency resource unit of the first configuration may merely occupy one of the at least two orthogonal frequency division multiplexing symbols of the control area. In addition, when the plurality of time-frequency resource units of the first configuration are respectively located on the at least two orthogonal frequency division multiplexing symbols of the control area, frequency domain locations of the plurality of time-frequency resource units of the first configuration on the at least two orthogonal frequency division multiplexing symbols may be the same or may be different. This embodiment of this application imposes no limitation thereto.

Optionally, the control area occupies at least three orthogonal frequency division multiplexing symbols in time domain, and the configuration of the time-frequency resource unit includes the first configuration and/or the second configuration.

Optionally, the time-frequency resource unit of the second configuration is located on at least two adjacent orthogonal frequency division multiplexing symbols in the orthogonal frequency division multiplexing symbols occupied by the control area.

In some embodiments, the control area occupies at least three orthogonal frequency division multiplexing symbols in time domain, and the time-frequency resource unit of the control channel may include only the time-frequency resource unit of the first configuration (as shown in A in FIG. 8), or may include only the time-frequency resource unit of the second configuration.

In some embodiments, the time-frequency resource unit of the second configuration occupies at least two orthogonal frequency division multiplexing symbols in time domain. Correspondingly, the configuration of the time-frequency resource unit may include the first configuration and the second configuration. To be specific, the time-frequency resource unit of the control channel may include the time-frequency resource unit of the first configuration and the time-frequency resource unit of the second configuration.

Figure 8:
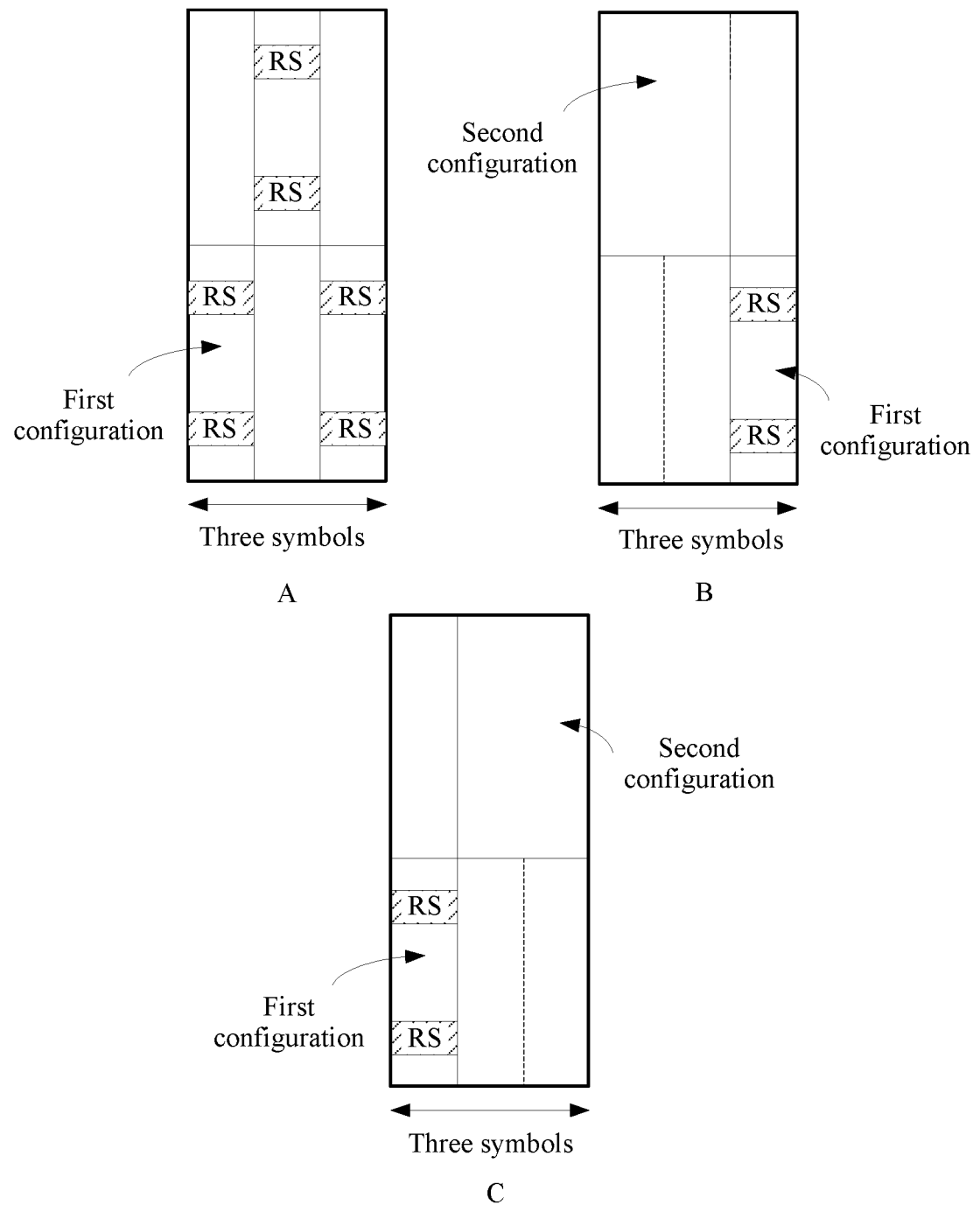
FIG. 8 is a schematic diagram of a configuration of a time-frequency resource unit according to another embodiment of this application.

The time-frequency resource unit of the second configuration may be located on at least two adjacent orthogonal frequency division multiplexing symbols (as shown in B and C in FIG. 8). It should be understood that the time-frequency resource unit of the second configuration in B and C in FIG. 8 may include the time-frequency resource unit of the second configuration in Implementation 1, or may include the time-frequency resource unit of the second configuration in Implementation 2, or may include the time-frequency resource unit of the second configuration in Implementation 1 and the time-frequency resource unit of the second configuration in Implementation 2.

It should be noted that, when the time-frequency resource unit of the control channel includes only the time-frequency resource unit of the first configuration, a plurality of time-frequency resource units of the first configuration may be respectively located on different orthogonal frequency division multiplexing symbols of the control area, as shown in A in FIG. 8; or the time-frequency resource unit of the first configuration may be merely located on at least some orthogonal frequency division multiplexing symbols of the control area. In addition, when the plurality of time-frequency resource units of the first configuration are respectively located on the at least some orthogonal frequency division multiplexing symbols of the control area, frequency domain locations of the plurality of time-frequency resource units of the first configuration on the orthogonal frequency division multiplexing symbols may be the same or may be different. This embodiment of this application imposes no limitation thereto. It should be further noted that a frequency domain location of the time-frequency resource unit of the second configuration located on at least two orthogonal frequency division multiplexing symbols may be the same as or may be different from that of the time-frequency resource unit of the first configuration located on one orthogonal frequency division multiplexing symbol. This embodiment of this application imposes no limitation thereto. A, B, and C in FIG. 8 are merely examples, and shall not constitute any limitation on this embodiment of this application.

Optionally, in step 220, the base station may send the indication information in a plurality of implementations. The following uses four implementations as an example for description.

First Implementation

There is a correspondence between the configuration of the time-frequency resource unit and a downlink control information format, and the configuration of the time-frequency resource unit is indicated by using the downlink control information format. The downlink control information format may be used to indicate a configuration of a time-frequency resource unit of a control channel transmitted after a preset time period (for example, at least one timeslot).

Correspondingly, the sending, by the base station, indication information to a terminal device in step 220 includes:

determining, by the base station based on the configuration of the time-frequency resource unit and the correspondence, the downlink control information format corresponding to the configuration of the time-frequency resource unit; and sending, by the base station, downlink control information in the corresponding format to the terminal device.

After receiving the downlink control information in the corresponding format, the terminal device may determine, based on the corresponding format and the correspondence between the configuration of the time-frequency resource unit and the downlink control information format, the configuration of the time-frequency resource unit of the control channel transmitted after the preset time period.

Second Implementation

An indication channel may be predefined, and the indication channel is used to transmit the indication information used to indicate the configuration of the time-frequency resource unit, that is, the indication information may be carried in the indication channel.

Correspondingly, the sending, by the base station, indication information to a terminal device in step 220 includes:

sending, by the base station, the indication information to the terminal device by using the indication channel.

The indication information may include information of at least one bit. For example, the indication information may include 1-bit information, 2-bit information, or 3-bit information.

Optionally, the indication channel may be transmitted in the time-frequency resource area in the control area.

In some embodiments, configurations of time-frequency resource units in different time-frequency resource areas in the at least one time-frequency resource area used for transmitting the control channel are different.

Optionally, an indication channel transmitted in each time-frequency resource area is used to indicate a configuration of a time-frequency resource unit in the current time-frequency resource area.

Third Implementation

The indication information is carried in downlink control information.

Figure 9:
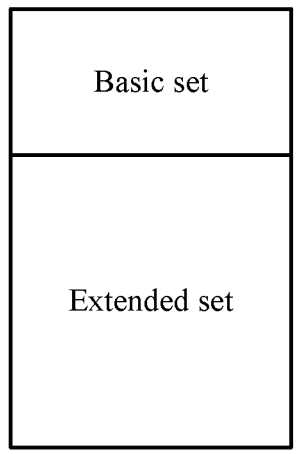
FIG. 9 is a schematic diagram of a control area.

As shown in FIG. 9, the control area may include a basic set area and an extended set area, a control channel in which the downlink control information is located is transmitted in the basic set area, and the configuration of the time-frequency resource unit indicated by the indication information is a configuration of a time-frequency resource unit of a control channel transmitted in the extended set area.

Correspondingly, the sending, by the base station, indication information to a terminal device in step 220 includes:

sending, by the base station, the downlink control information to the terminal device, where the downlink control information includes the indication information, and the control channel in which the downlink control information is located is transmitted in the basic set area.

Optionally, a configuration of a time-frequency resource unit of a control channel transmitted in the basic set area may be preset, or may be indicated by system information, or may be indicated by using a broadcast channel.

Fourth Implementation

The indication information is carried in higher layer signaling or system information.

Correspondingly, the sending, by the base station, indication information to a terminal device in step 220 includes:

sending, by the base station, the higher layer signaling or the system information to the terminal device, where the higher layer signaling or the system information carries the indication information.

The higher layer signaling may be radio resource control (Radio Resource Control, RRC) signaling, and the system information may be a master information block (Master Information Block, MIB).

At least one bit may be set in the higher layer signaling or the system information to represent the configuration of the time-frequency resource unit.

In this embodiment of this application, an information bit of at least one bit may be used to represent the indication information used to indicate the configuration of the time-frequency resource unit.

For example, when the control area occupies two orthogonal frequency division multiplexing symbols in time domain, a 2-bit information bit may be used to represent the indication information. For example, the 2-bit information bit may be set in the higher layer signaling, the system information, or the downlink control information, and a meaning of the 2-bit information bit is as follows:

00: The configuration of the time-frequency resource unit includes the first configuration.

01: The configuration of the time-frequency resource unit includes the second configuration.

10-11: Reserved.

For example, when the control area occupies three orthogonal frequency division multiplexing symbols in time domain, a 3-bit information bit may be used to represent the indication information. For example, the 3-bit information bit may be set in the higher layer signaling, the system information, or the downlink control information, and a meaning of the 3-bit information bit is as follows:

000: The configuration of the time-frequency resource unit includes the first configuration.

001: The configuration of the time-frequency resource unit includes the first configuration and the second configuration.

010: The configuration of the time-frequency resource unit includes the second configuration.

011-111: Reserved.

It should be understood that the foregoing merely uses two bits and three bits as an example for description. However, this embodiment of this application imposes no limitation thereto. Another quantity of bits may also be used to represent the indication information. For example, when one bit is used to represent the indication information, "0" may indicate that the configuration of the time-frequency resource unit includes the first configuration, and "1" may indicate that the configuration of the time-frequency resource unit includes the second configuration.

It should be understood that, when the second configuration includes a plurality of implementations, the indication information may be further used to indicate an implementation used by the second configuration.

Optionally, the indication information may further indicate a time domain location and/or a frequency domain location of a reference signal carried in the time-frequency resource unit. Therefore, complexity of detecting the reference signal by the terminal device can be reduced.

Optionally, the indication information may further indicate a solution of transmitting the control channel. The solution of transmitting the control channel may be a transmit diversity solution, a beamforming solution, or the like. Therefore, the solution of transmitting the control channel by the terminal device can be flexibly scheduled.

With reference to FIG. 2 to FIG. 9, the foregoing describes the control channel resource configuration method according to the embodiment of this application. With reference to FIG. 10 to FIG. 13, the following describes a base station and a terminal device according to embodiments of this application.

Figure 10:
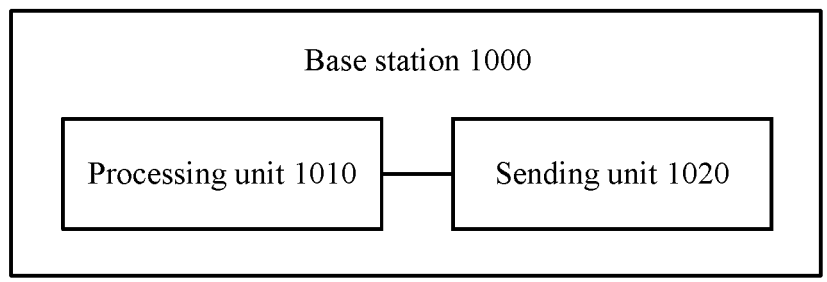
FIG. 10 is a schematic structural diagram of a base station according to an embodiment of this application.

FIG. 10 is a schematic structural diagram of a base station 1000 according to an embodiment of this application. As shown in FIG. 10, the base station 1000 includes a processing unit 1010 and a sending unit 1020.

The processing unit 1010 is configured to determine a configuration of a time-frequency resource unit from at least two configurations of a time-frequency resource unit of a control channel.

The sending unit 1020 is configured to send indication information to a terminal device, where the indication information is used to indicate the configuration of the time-frequency resource unit determined by the processing unit 1010.

The at least two configurations of a time-frequency resource unit include a first configuration and a second configuration.

A time-frequency resource unit of the first configuration occupies one orthogonal frequency division multiplexing symbol in time domain, and a reference signal is located on the orthogonal frequency division multiplexing symbol occupied by the time-frequency resource unit of the first configuration.

A time-frequency resource unit of the second configuration occupies at least two orthogonal frequency division multiplexing symbols in time domain, and a reference signal is located on at least one of the at least two orthogonal frequency division multiplexing symbols occupied by the time-frequency resource unit of the second configuration.

In this embodiment of this application, the base station can flexibly configure the time-frequency resource unit of the control channel in a control area.

In addition, flexibly configuring a time-frequency resource unit can reduce a probability that time-frequency resource units of different structures are blocked, thereby reducing complexity of detecting the control channel by the terminal device.

Optionally, a control area in which the time-frequency resource unit of the control channel is located occupies at least two orthogonal frequency division multiplexing symbols in time domain.

Optionally, the control channel is transmitted in at least one time-frequency resource area in a control area. Correspondingly, the processing unit 1010 may be specifically configured to determine a configuration of a time-frequency resource unit in each of the at least one time-frequency resource area from the at least two configurations of a time-frequency resource unit. The indication information is used to indicate a configuration of a time domain resource unit in each of the at least one time-frequency resource area.

Optionally, the control area in which the time-frequency resource unit of the control channel is located occupies at least three orthogonal frequency division multiplexing symbols in time domain, and the configuration of the time-frequency resource unit includes the first configuration and/or the second configuration.

Optionally, the time-frequency resource unit of the second configuration is located on at least two adjacent orthogonal frequency division multiplexing symbols in the orthogonal frequency division multiplexing symbols occupied by the control area.

Optionally, in a same time-frequency resource area, the time-frequency resource unit of the first configuration and the time-frequency resource unit of the second configuration are located on different orthogonal frequency division multiplexing symbols of the control area.

Optionally, each of at least two of the orthogonal frequency division multiplexing symbols occupied by the time-frequency resource unit of the second configuration carries a different quantity of reference signals; or each of the orthogonal frequency division multiplexing symbols occupied by the time-frequency resource unit of the second configuration carries a same quantity of reference signals.

Optionally, the reference signals respectively carried in the orthogonal frequency division multiplexing symbols occupied by the time-frequency resource unit of the second configuration are located in a same frequency domain location.

Optionally, there is a correspondence between the configuration of the time-frequency resource unit and a downlink control information format, and the configuration of the time-frequency resource unit is indicated by using the downlink control information format. Correspondingly, the processing unit 1010 is further configured to determine, based on the configuration of the time-frequency resource unit and the correspondence, the downlink control information format corresponding to the configuration of the time-frequency resource unit; and the sending unit 1020 is specifically configured to send downlink control information in the corresponding format to the terminal device.

Optionally, the indication information is carried in an indication channel, and the indication channel is transmitted in a time-frequency resource area in the control area.

Optionally, the control area includes a basic set area and an extended set area.

Optionally, the indication information is carried in the downlink control information, a control channel in which the downlink control information is located is transmitted in the basic set area, and the configuration of the time-frequency resource unit is a configuration of a time-frequency resource unit that constitutes a time-frequency resource for a control channel transmitted in the extended set area.

Optionally, a configuration of a time-frequency resource unit of a control channel transmitted in the basic set area is pre-configured, or a configuration of a time-frequency resource unit of a control channel transmitted in the basic set area is indicated by using a broadcast channel.

Optionally, the indication information is carried in higher layer signaling or system information.

It should be understood that the base station 1000 according to this embodiment of this application may correspond to the base station in the control channel configuration method 200 according to the embodiment of this application. In addition, the foregoing and other operations and/or functions of the units in the base station 1000 are intended to implement corresponding procedures of the base station in the method 200 in FIG. 2. For brevity, details are not described herein again.

Figure 11:
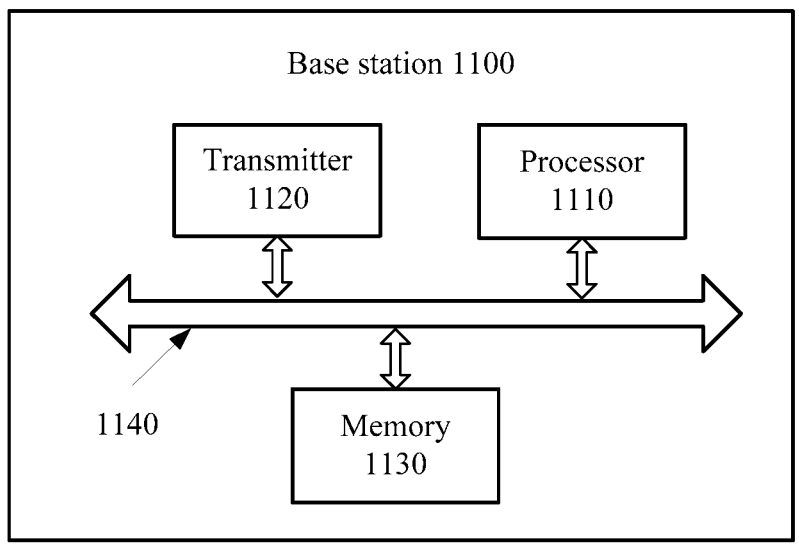
FIG. 11 is a schematic structural diagram of a base station according to another embodiment of this application.

It should be noted that the processing unit 1010 may be implemented by a processor, and the sending unit 1020 may be implemented by a transmitter. FIG. 11 is a schematic structural diagram of a base station 1100 according to another embodiment of this application. As shown in FIG. 11, the base station 1100 includes a processor 1110, a transmitter 1120, a memory 1130, and a bus system 1140. All components of the base station 1100 are coupled together by using the bus system 1140.

The memory 1130 may be configured to store code or the like executed by the processor 1110. The transmitter 1120 is configured to send a signal under control of the processor 1110.

Specifically, the processor 1110 is configured to implement a function of the processing unit 1010, and the transmitter 1120 is configured to implement a function of the sending unit 1020.

It should be understood that the base station 1100 according to this embodiment of this application may correspond to the base station in the control channel configuration method 200 according to the embodiment of this application and the base station 1000 according to the embodiment of this application. In addition, the foregoing and other operations and/or functions of the units in the base station 1100 are intended to implement corresponding procedures of the base station in the method 200 in FIG. 2. For brevity, details are not described herein again.

Figure 12:
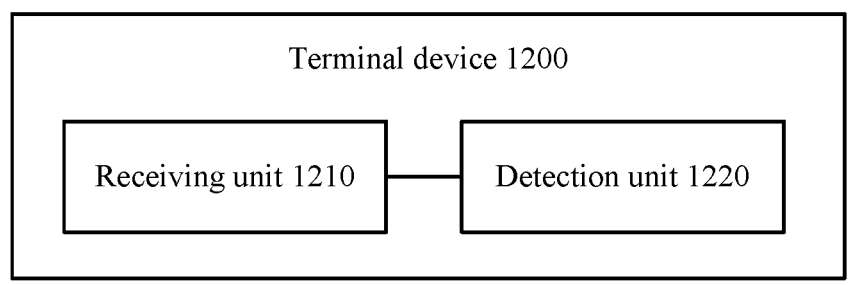
FIG. 12 is a schematic structural diagram of a terminal device according to an embodiment of this application.

FIG. 12 is a schematic structural diagram of a terminal device 1200 according to an embodiment of this application. As shown in FIG. 12, the terminal device 1200 includes a receiving unit 1210 and a detection unit 1220.

The receiving unit 1210 is configured to receive indication information sent by a base station, where the indication information is used to indicate a configuration of a time-frequency resource unit that constitutes a time-frequency resource for a control channel, and the configuration of the time-frequency resource unit is determined by the base station from at least two configurations of a time-frequency resource unit.

The detection unit 1220 is configured to detect the control channel based on the configuration of the time-frequency resource unit indicated by the indication information received by the receiving unit 1210.

The at least two configurations of a time-frequency resource unit include a first configuration and a second configuration.

A time-frequency resource unit of the first configuration occupies one orthogonal frequency division multiplexing symbol in time domain, and a reference signal is located on the orthogonal frequency division multiplexing symbol occupied by the time-frequency resource unit of the first configuration.

A time-frequency resource unit of the second configuration occupies at least two orthogonal frequency division multiplexing symbols in time domain, and a reference signal is located on at least one of the at least two orthogonal frequency division multiplexing symbols occupied by the time-frequency resource unit of the second configuration.

In this embodiment of this application, the base station can flexibly configure the time-frequency resource unit of the control channel in a control area.

In addition, flexibly configuring a time-frequency resource unit can reduce a probability that time-frequency resource units of different structures are blocked, thereby reducing complexity of detecting the control channel by the terminal device.

In addition, the terminal device detects the control channel based on the configuration of the time-frequency resource unit indicated by the base station. This can reduce the complexity of detecting the control channel by the terminal device.

Optionally, a control area in which the time-frequency resource unit of the control channel is located occupies at least two orthogonal frequency division multiplexing symbols in time domain.

Optionally, the control channel is transmitted in at least one time-frequency resource area in a control area; and the indication information is used to indicate a configuration of a time domain resource unit in each of the at least one time-frequency resource area.

Optionally, the control area occupies at least three orthogonal frequency division multiplexing symbols in time domain, and the configuration of the time-frequency resource unit includes the first configuration and/or the second configuration.

Optionally, the time-frequency resource unit of the second configuration is located on at least two adjacent orthogonal frequency division multiplexing symbols in the orthogonal frequency division multiplexing symbols occupied by the control area.

Optionally, in a same time-frequency resource area, the time-frequency resource unit of the first configuration and the time-frequency resource unit of the second configuration are located on different orthogonal frequency division multiplexing symbols of the control area.

Optionally, each of at least two of the orthogonal frequency division multiplexing symbols occupied by the time-frequency resource unit of the second configuration carries a different quantity of reference signals; or each of the orthogonal frequency division multiplexing symbols occupied by the time-frequency resource unit of the second configuration carries a same quantity of reference signals.

Optionally, the reference signals respectively carried in the orthogonal frequency division multiplexing symbols occupied by the time-frequency resource unit of the second configuration are located in a same frequency domain location.

Optionally, there is a correspondence between the configuration of the time-frequency resource unit and a downlink control information format, and the configuration of the time-frequency resource unit is indicated by using the downlink control information format. Correspondingly, the receiving unit 1210 is specifically configured to receive downlink control information that is sent by the base station and that is in the format corresponding to the configuration of the time-frequency resource unit.

Optionally, the indication information is carried in an indication channel, and the indication channel is transmitted in a time-frequency resource area in the control area.

Optionally, the indication information carried in the indication channel transmitted in the time-frequency resource area is used to indicate a configuration of a time-frequency resource unit in the time-frequency resource area.

Optionally, the indication information is carried in downlink control information; and the control area includes a basic set area and an extended set area, a control channel in which the downlink control information is located is transmitted in the basic set area, and the configuration of the time-frequency resource unit is a configuration of a time-frequency resource unit of a control channel transmitted in the extended set area.

Optionally, the control area includes a basic set area; and a configuration of a time-frequency resource unit of a control channel transmitted in the basic set area is pre-configured, or a configuration of a time-frequency resource unit of a control channel transmitted in the basic set area is indicated by using a broadcast channel.

Optionally, the indication information is carried in higher layer signaling or system information.

It should be understood that the terminal device 1200 according to this embodiment of this application may correspond to the terminal device in the control channel configuration method 200 according to the embodiment of this application. In addition, the foregoing and other operations and/or functions of the units in the terminal device 1200 are intended to implement corresponding procedures of the terminal device in the method 200 in FIG. 2. For brevity, details are not described herein again.

Figure 13:
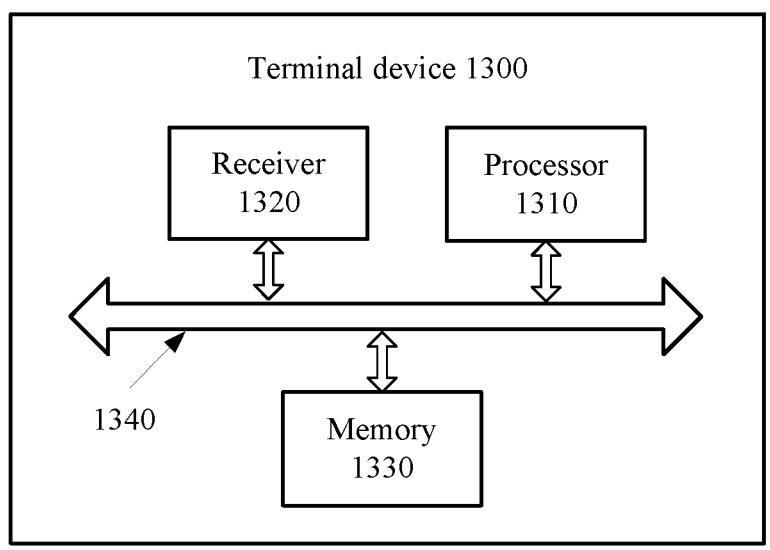
FIG. 13 is a schematic structural diagram of a terminal device according to another embodiment of this application.

It should be noted that the receiving unit 1210 may be implemented by a receiver, and the detection unit 1220 may be implemented by a processor. FIG. 13 is a schematic structural diagram of a terminal device 1300 according to another embodiment of this application. As shown in FIG. 13, the terminal device 1300 includes a processor 1310, a receiver 1320, a memory 1330, and a bus system 1340. All components of the terminal device 1300 are coupled together by using the bus system 1340.

The memory 1330 may be configured to store code or the like executed by the processor 1310. The receiver 1320 is configured to receive a signal under control of the processor 1310.

Specifically, the processor 1310 is configured to implement a function of the detection unit 1220, and the receiver 1320 is configured to implement a function of the receiving unit 1210.

It should be understood that the terminal device 1300 according to this embodiment of this application may correspond to the terminal device in the control channel configuration method 200 according to the embodiment of this application and the terminal device 1200 according to the embodiment of this application. In addition, the foregoing and other operations and/or functions of the units in the terminal device 1300 are intended to implement corresponding procedures of the terminal device in the method 200 in FIG. 2. For brevity, details are not described herein again.

It should be noted that, in addition to a data bus, the bus system in the foregoing embodiments may further include a power bus, a control bus, a status signal bus, and the like. For ease of representation, various buses are marked as the bus system in the figure.

The memory in the foregoing embodiments may include a volatile memory, such as a random access memory (RAM); the memory may include a nonvolatile memory, such as a flash memory, a hard disk drive (HDD), or a solid state drive (SSD); or the memory may include a combination of the foregoing memories.

In the foregoing embodiments, the processor may be a central processing unit (CPU), a network processor (NP), or a combination of a CPU and an NP. The processor may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), generic array logic (GAL), or any combination thereof.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the embodiments of this application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the embodiments of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A control channel resource configuration method, comprising:
determining, by a base station, a configuration of a time-frequency resource unit of a first control channel from at least two configurations of time-frequency resource units of control channels; and
sending, by the base station, indication information by a higher layer signaling to a terminal device, wherein the indication information is used to indicate the configuration of the time-frequency resource unit of the first control channel, wherein
the at least two configurations of time-frequency resource units comprise a first configuration and a second configuration;
a time-frequency resource unit of the first configuration occupies one orthogonal frequency division multiplexing symbol in time domain, and a reference signal for demodulating control channels is located on the orthogonal frequency division multiplexing symbol occupied by the time-frequency resource unit of the first configuration; and a time-frequency resource unit of the second configuration occupies at least two orthogonal frequency division multiplexing symbols in time domain, and a reference signal for demodulating control channels is located on at least one of the at least two orthogonal frequency division multiplexing symbols occupied by the time-frequency resource unit of the second configuration.

2. The method according to claim 1, wherein the first control channel is located in at least one time-frequency resource area in a control area; and
the determining, by a base station, a configuration of time-frequency resource unit of a first control channel from at least two configurations of time-frequency resource units of control channels comprises:
determining, by the base station, a configuration of a time-frequency resource unit in each of the at least one time-frequency resource area from the at least two configurations of time-frequency resource units, wherein
the indication information is used to indicate a configuration of a time-frequency resource unit in each of the at least one time-frequency resource area.

3. The method according to claim 2, wherein the time-frequency resource unit of the second configuration is located on at least two adjacent orthogonal frequency division multiplexing symbols in the orthogonal frequency division multiplexing symbols occupied by the control area.

4. The method according to claim 1, wherein
for a time-frequency resource unit of the second configuration, each of the orthogonal frequency division multiplexing symbols occupied by the time-frequency resource unit of the second configuration carries a same quantity of reference signals.

5. The method according to claim 1, wherein:
for a time-frequency resource unit of the second configuration, reference signals respectively carried in the orthogonal frequency division multiplexing symbols occupied by the time-frequency resource unit of the second configuration are located in a same frequency domain location.

6. The method according to claim 1, wherein time-frequency resources of control channels includes a plurality of time-frequency resource units.

7. An apparatus, comprising:
one or more processors, and
a non-transitory storage medium configure to store program instructions;
wherein, when executed by the one or more processors, the instructions cause the apparatus to perform a method that comprises:
determining a configuration of a time-frequency resource unit of a first control channel from at least two configurations of time-frequency resource units of control channels; and
sending indication information to a terminal device by a higher layer signaling, wherein the indication information is used to indicate the configuration of the time-frequency resource unit of the first control channel, wherein
the at least two configurations of time-frequency resource units comprise a first configuration and a second configuration;
a time-frequency resource unit of the first configuration occupies one orthogonal frequency division multiplexing symbol in time domain, and a reference signal for demodulating control channels is located on the orthogonal frequency division multiplexing symbol occupied by the time-frequency resource unit of the first configuration; and
a time-frequency resource unit of the second configuration occupies at least two orthogonal frequency division multiplexing symbols in time domain, and a reference signal for demodulating control channels is located on at least one of the at least two orthogonal frequency division multiplexing symbols occupied by the time-frequency resource unit of the second configuration.

8. The apparatus according to claim 7, wherein the first control channel is located in at least one time-frequency resource area in a control area;
the determining a configuration of a time-frequency resource unit of a first control channel from at least two configurations of time-frequency resource units of control channels, further comprising:
determining a configuration of a time-frequency resource unit in each of the at least one time-frequency resource area from the at least two configurations of a time-frequency resource unit; and
the indication information is used to indicate a configuration of a time domain resource unit in each of the at least one time-frequency resource area.

9. The apparatus according to claim 8, wherein the time-frequency resource unit of the second configuration is located on at least two adjacent orthogonal frequency division multiplexing symbols in the orthogonal frequency division multiplexing symbols occupied by the control area.

10. The apparatus according to claim 7, wherein:
for a time-frequency resource unit of the second configuration, each of the orthogonal frequency division multiplexing symbols occupied by the time-frequency resource unit of the second configuration carries a same quantity of reference signals.

11. The apparatus according to claim 7, wherein:
for a time-frequency resource unit of the second configuration, reference signals respectively carried in the orthogonal frequency division multiplexing symbols occupied by the time-frequency resource unit of the second configuration are located in a same frequency domain location.

12. The apparatus according to claim 7, wherein time-frequency resources of control channels include a plurality of time-frequency resource units.

13. A non-transitory computer-readable medium having program instructions recorded thereon, wherein, when executed by a processor of an apparatus, the instructions cause the apparatus to:
determine a configuration of a time-frequency resource unit of a first control channel from at least two configurations of time-frequency resource units of control channels; and
send indication information to a terminal device by a higher layer signaling, wherein the indication information is used to indicate the configuration of the time-frequency resource unit of the first control channel, wherein
the at least two configurations of time-frequency resource units comprise a first configuration and a second configuration;
a time-frequency resource unit of the first configuration occupies one orthogonal frequency division multiplexing symbol in time domain, and a reference signal for demodulating control channels is located on the orthogonal frequency division multiplexing symbol occupied by the time-frequency resource unit of the first configuration; and a time-frequency resource unit of the second configuration occupies at least two orthogonal frequency division multiplexing symbols in time domain, and a reference signal for demodulating control channels is located on at least one of the at least two orthogonal frequency division multiplexing symbols occupied by the time-frequency resource unit of the second configuration.

14. The non-transitory computer-readable medium according to claim 13, wherein the first control channel is located in at least one time-frequency resource area in a control area; and the instructions further cause the apparatus to:

determine a configuration of a time-frequency resource unit in each of the at least one time-frequency resource area from the at least two configurations of time-frequency resource units, wherein the indication information is used to indicate a configuration of a time-frequency resource unit in each of the at least one time-frequency resource area.

15. The non-transitory computer-readable medium according to claim 14, wherein the time-frequency resource unit of the second configuration is located on at least two adjacent orthogonal frequency division multiplexing symbols in the orthogonal frequency division multiplexing symbols occupied by the control area.

16. The non-transitory computer-readable medium according to claim 13, wherein:

for a time-frequency resource unit of the second configuration, each of the orthogonal frequency division multiplexing symbols occupied by the time-frequency resource unit of the second configuration carries a same quantity of reference signals.

17. The non-transitory computer-readable medium according to claim 13, wherein:

for a time-frequency resource unit of the second configuration, reference signals respectively carried in the orthogonal frequency division multiplexing symbols occupied by the time-frequency resource unit of the second configuration are located in a same frequency domain location.

\* \* \* \* \*